Dec. 16, 1969    E. A. RODIN    3,484,114
SCREW INSTALLING ATTACHMENT FOR POWER TOOLS
Filed Sept. 12, 1967
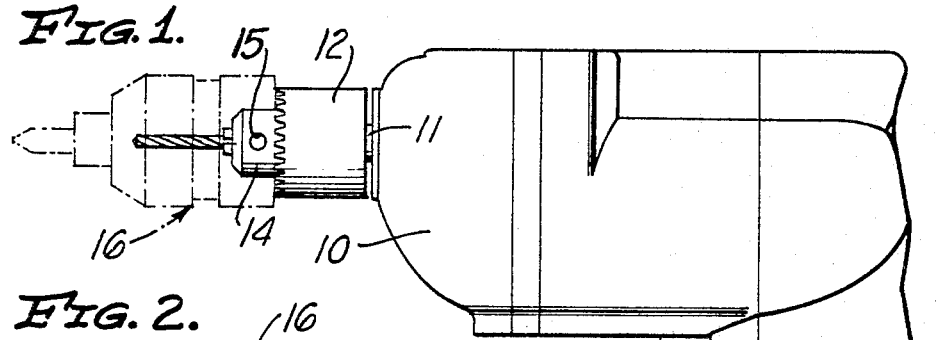
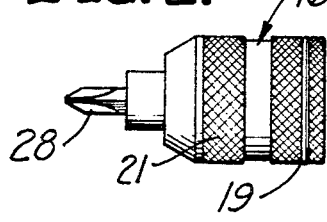
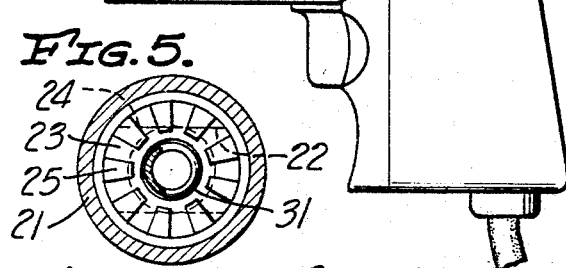
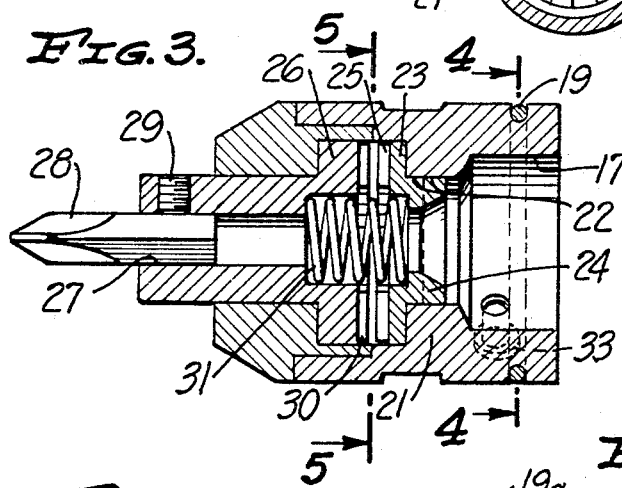
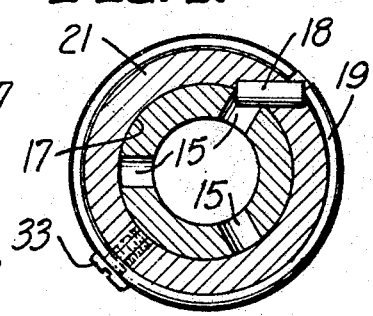
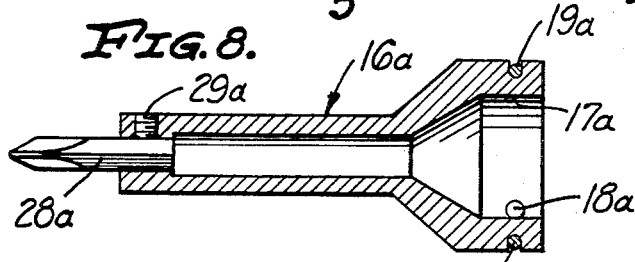
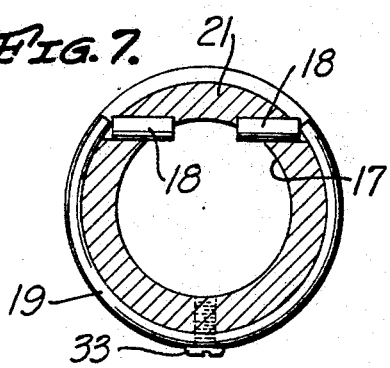
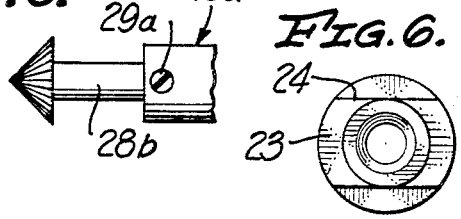
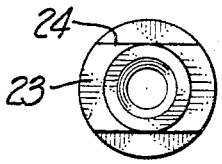
INVENTOR
EMIL A. RODIN
BY
Robert C. Comstock
ATTORNEY

United States Patent Office

3,484,114
Patented Dec. 16, 1969

3,484,114
SCREW INSTALLING ATTACHMENT FOR
POWER TOOLS
Emil A. Rodin, 3010 Palmer Drive,
Los Angeles, Calif. 90065
Filed Sept. 12, 1967, Ser. No. 667,270
Int. Cl. B23b 31/04
U.S. Cl. 279—1                                  9 Claims

ABSTRACT OF THE DISCLOSURE

A screw installing attachment for power tools which is adapted to fit on the chuck of a power tool directly over a drill, without first removing the drill from the power tool. The attachment may have impact type driving means. With this attachment, a worker can use a single power tool to drill a screw receiving opening, counterbore the opening if necessary and install the screw in the opening. The attachment preferably may be attached to the chuck without waiting for the chuck to stop rotating.

BACKGROUND OF THE INVENTION

Field of the invention

The invention pertains to screw installing attachments for use with power tools.

Description of the prior art

At the present time, a worker uses one power tool to drill a screw receiving opening. He then puts down the power tool and uses another power tool or a hand tool to drive and install a screw in the opening. If the screw receiving opening must be counter-bored, this requires still another power or hand tool.

Even if a self-drilling screw is used, it is usually necessary for the worker to drill at least one small opening for the purpose of marking the proper location of the screw and to act as a pilot hole to provide a proper start for the screw.

SUMMARY OF THE INVENTION

The present invention provides an attachment for a power tool which enables a single power tool to be used to drill a screw receiving opening and to install a screw in the opening. This is accomplished by providing an attachment which fits directly over the drill without first removing the drill from the power tool. The attachment carries a screw driving blade at its forward end which is driven by the power tool to install the screw.

If the screw is to be counter-sunk, another attachment which carries a counter-boring tool at its forward end is mounted on the power tool directly over the drill, and the same power tool can be used to drill the counter-bore before the screw is installed.

It is accordingly the primary object of the present invention to provide screw installing attachments for power tools which permit the entire screw installing operation to be performed with a single power tool. This reduces the number of power tools which a worker must have and use. It accordingly provides more rapid and efficient installation of screws, with a resulting saving in time and labor cost. It simplifies screw installing operations in difficult areas such as on ladders and scaffolds.

In one embodiment of the invention, the attachment can be attached to the chuck of the power tool while the chuck is still rotating, thus saving additional time for the worker, with a corresponding reduction in labor cost.

The attachment of the present invention can also be combined with impact type driving means.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of the invention.

BRIEF DESCRIPTION OF THE DRAWING

Referring to the drawings,
FIG. 1 is a side elevational view of a power tool, with a mounted screw driving attachment shown in phantom lines;
FIG. 2 is a side elevational view of a screw driving attachment;
FIG. 3 is an enlarged longitudinal sectional view of the attachment;
FIG. 4 is a sectional view taken on line 4—4 of FIG. 3, showing the attachment in use, with the pin of the attachment engaging an opening in the chuck;
FIG. 5 is a sectional view taken on line 5—5 of FIG. 3;
FIG. 6 is a rear elevational view of the first driving member;
FIG. 7 is a sectional view similar to FIG. 4, showing an attachment which is adapted for use with a reversible motor;
FIG. 8 is a sectional view similar to FIG. 3 of an attachment without impact type driving means;
FIG. 9 is a side elevational view of the end of the attachment of FIG. 8 with a counter-boring tool in place of a screw driving bit.

DESCRIPTION OF THE PREFERRED EMBODIMENT

A preferred embodiment which has been selected to illustrate the invention is adapted to be used with a power tool 10 of a conventional type having a rotating shaft 11. A chuck 12 is mounted on the end of the shaft 11 by screw threading or other suitable means. The chuck 12 has means at its forward end for holding a drill 24.

The chuck 12 is provided with a cylindrical portion 14, which must have at least one opening 15 therein. The drawings show three openings 15 because a chuck customarily has three spaced chuck key openings.

The attachment 16 is adapted to be manually mounted on and removed from the chuck 12. It has a cavity 17 which opens inwardly from one end of the attachment 16 and which is dimensioned to fit around the cylindrical portion 14 of the chuck 12 and also around the entire drill 24. The portion of the cavity 17 which is adjacent to the end of the attachment 16 is cylindrical and is provided with at least one diagonally mounted retractable pin 18 for a single direction rotating chuck. For a reversible rotation chuck, the attachment 16 has a pair of pins 18 which are directed in opposite directions from each other, as shown in FIG. 7 of the drawings.

The outer periphery of the attachment 16 is provided with an annular groove in which there is mounted a circular spring 19. The end of the spring 19 contacts one or both pins 18 and urges them inwardly, so that a portion of the inner end of each pin 18 extends into the cavity 17. The inner end of the pin 18 abuts against a shoulder 40, which acts as a stop to limit the inward movement of the pin 18. A fastener 33 has an enlarged head which overlies and engages the center of the spring 19 to hold it in place.

When the attachment 16 is mounted on the chuck 12, the pin 18 is depressed by engagement with the cylindrical portion 14 of the chuck 12. Upon rotation of the chuck 12 with respect to the attachment 16 or vice versa, the pin 18 upon becoming aligned with the opening 15 is urged into the opening 15 by pressure from the spring 19. The pin 18 is angled so that the protruding portion of its inner end is engaged by the wall of the opening 15 during rotation of the chuck 12 and the attachment 16 is thereby rotated.

It should be noted that the attachment 16 can easily be mounted on the chuck 12 while the chuck is still rotating (coasting), and the operator need not wait for the chuck to come to a complete stop. This saves the operator time in using the device. The attachment is manually slipped on the chuck over the drill, and then manually slipped off the chuck without requiring any tools or attaching means or devices other than that provided by the attachment.

The attachment 16 cannot be removed from the chuck 12 by exerting pulling pressure upon it because the rear or inner wall of the opening 15 engages the side of the pin 18. The attachment 16 can be removed only by first rotating it in the same direction in which it is being driven, so that the angularly directed side wall of the pin 18 is engaged by the wall of the opening 15 to move the pin 18 outwardly against pressure of the spring 19.

The attachment may contain means whereby the tool or blade carried by the forward end of the attachment 16 is out of driving engagement with the chuck 12 except when forward pressure is exerted upon tool 10 to push it toward the work.

This is achieved through impact means which comprises a cylindrical housing 21 having a substantially rectangular recess 22 formed therein. A first driving member 23 has a rectangular base 24 which is dimensioned to fit in the rectangular recess 22, so that the first driving member 23 is rotated along with the housing 21 and chuck 12. The side of the first driving member 23 opposite from the base 24 has a plurality of spaced raised teeth 25 which are radially tapered and which have somewhat rounded upper surfaces.

A second driving member 26 has a socket 27 at its outer end for removably receiving the shank 28 of a screwdriver or other tool, which is held by a transversely directed screw 29. The inwardly directed side of the second driving member 26 has a plurality of spaced raised teeth 30 which are substantially identical to the teeth 25 and are dimensioned to fit therebetween. A coil spring 31 extends between the driving members 23 and 26 and normally urges the teeth 25 and 30 out of engagement with each other.

The second driving member 26 and the tool 28 carried by it are accordingly normally out of engagement with the chuck 12. They are rotated only if the tool is brought into engagement with the work and sufficient forward pressure is brought to bear upon the tool 10 to overcome the pressure of the coil spring 31 and move the teeth 25 into engagement with the teeth 30. This driving engagement is released immediately upon the release of forward pressure on the tool 10 by the user. This provides better control of the device for the user and avoids damaging the work by over-driving.

FIG. 7 of the drawings shows an attachment having a pair of pins 18. This attachment may be used with a chuck driven by a reversible motor. One of the pins 18 engages one of the openings 15 when the motor is driven in one direction, and the other pin 18 engages another opening 15 when the motor and chuck are reversed.

An alternative embodiment of the invention shown in FIG. 8 of the drawings comprises an attachment which has no impact driving means. It comprises an attachment 16a having a cavity 17a which removably received the chuck and drill. A retractable pin 18a is urged inwardly by a spring 19a. The driving bit 28a of a screwdriver is held by a screw 29a.

It should be noted that any other suitable means besides the spring and pin assembly shown and described may also be used in this or the other embodiments of the invention for the purpose of removably securing the attachment to the chuck.

FIG. 9 of the drawings shows the device of FIG. 8 in which the driving bit 28a has been replaced by a counter-boring tool 28b.

A relatively short drill 28 or 28a has been shown in the drawings to shorten the figures. In use, any length of drill may be used, with the length of the cavity 17 being commensurate so that the attachment fits around the entire drill.

I claim:

1. A screw installing attachment for use with a power tool, said power tool having a rotatable chuck, a drill carried by the forward end of said chuck, said drill being adapted to drill a screw receiving opening, said attachment having a hollow cavity dimensioned to fit over said drill and the forward end of said chuck without removing said drill from said chuck, means carried by the rearward end of said attachment for engaging said chuck, so that said attachment can be manually mounted on said chuck over said drill for rotation by said chuck and manually removed from said chuck, and means carried by the forward end of said attachment for performing a step in the installation of a screw in said screw receiving opening.

2. The structure described in claim 1, said means carried by said attachment for engaging said chuck being engageable with said chuck while said chuck is still rotating, so that said attachment can be mounted upon said chuck without waiting for said chuck to come to a stop.

3. The structure described in claim 1, said means carried by the forward end of said attachment comprising a screw driving blade adapted to engage the head of a screw to install said screw in said screw receiving opening.

4. The structure described in claim 1, said means carried by said attachment for engagement with said chuck comprising a member engageable with an opening in said chuck.

5. The structure described in claim 4, said chuck having a substantially cyclindrical portion with at least one inwardly directed opening formed therein, said cavity having a cylindrical portion adapted to fit around the cylindrical portion of said chuck, at least one pin carried by said attachment, said pin extending into and engaging the wall of said opening when said attachment is mounted on said chuck.

6. The structure described in claim 5, said pin being retractable, and resilient means carried by said attachment, said resilient means resiliently urging said pin inwardly so that at least a portion of the inner end of said pin protrudes into such cavity.

7. The structure described in claim 5, said attachment having a pair of retractable pins, one of said pins engaging said opening when said chuck is rotated in one direction and the other of said pins engaging said opening when said chuck is rotated in the opposite direction.

8. The structure described in claim 6, said pin being mounted in an opening extending diagonally with respect to the radius of the cylindrical portion of said cavity, so that a portion of the inner end of said pin protrudes into said cavity while another portion of the inner end of said pin engages the inner end of the opening in which said pin is mounted, to limit the inward movement of said pin.

9. The structure described in claim 1, said attachment having impact type driving means including a pair of driving members, resilient means normally holding said driving members out of engagement with each other, said driving members being moved into engagement with each other upon the exertion of forward pressure upon said tool to overcome the pressure of said resilient means, said attachment being rotated only when said driving members are in engagement with each other.

(References on following page)

References Cited

UNITED STATES PATENTS

| | | | |
|---|---|---|---|
| 2,451,565 | 10/1948 | Landow | 279—1 |
| 2,536,017 | 1/1951 | Bamberger | 279—1 |
| 2,927,614 | 3/1960 | Ransom | 145—123 |
| 3,023,015 | 2/1962 | Pankow | 279—14 |
| 3,135,522 | 6/1964 | Bell | 279—97 |
| 3,289,290 | 12/1966 | Sandor | 145—50 X |
| 3,405,949 | 10/1968 | Cox | 279—9 |

THOMAS H. EAGER, Primary Examiner

U.S. Cl. XR.

7—14.1; 29—200, 240, 560; 144—32; 145—50, 123; 279—9, 97